United States Patent [19]

Liedermooy et al.

[11] Patent Number: 5,500,472
[45] Date of Patent: Mar. 19, 1996

[54] LOW APPLICATION TEMPERATURE HOT MELT ADHESIVE

[75] Inventors: Ingrid Liedermooy, Bridgewater, N.J.; Julie Birch, Surrey, Great Britain; Daniel C. Stauffer, Flemington; Paul P. Puletti, Pittstown, both of N.J.

[73] Assignee: National Starch and Chemical Investment Holding Corporation, Wilmington, Del.

[21] Appl. No.: 390,725

[22] Filed: Feb. 17, 1995

[51] Int. Cl.⁶ .............. C08J 5/00; C08L 91/06; C08L 77/00; C08K 5/01
[52] U.S. Cl. .......... 524/272; 524/275; 524/277; 524/487; 524/489; 524/502; 524/514; 524/515; 524/523; 525/288
[58] Field of Search ............... 524/272, 275, 524/487, 489, 277, 502, 514, 515, 523; 525/228

[56] References Cited

U.S. PATENT DOCUMENTS

| | | | |
|---|---|---|---|
| 3,884,786 | 5/1975 | Domine et al. | 204/159.14 |
| 4,070,316 | 1/1978 | Combs et al. | 260/28.5 |
| 4,146,521 | 3/1979 | Godfrey | 260/27 R |
| 4,167,433 | 9/1979 | Lakshmanan | 156/322 |
| 4,404,299 | 9/1983 | Decroix | 524/77 |
| 4,434,261 | 2/1984 | Brugel et al. | 524/109 |
| 4,460,728 | 7/1984 | Schmidt, Jr. et al. | 524/271 |
| 4,471,086 | 9/1984 | Foster | 524/489 |
| 4,500,661 | 2/1985 | Lakshmanan | 524/77 |
| 4,567,223 | 1/1986 | Ames | 524/489 |
| 4,631,308 | 12/1986 | Graham et al. | 524/272 |
| 4,752,634 | 6/1988 | Goss | 524/271 |
| 4,816,306 | 3/1989 | Brady et al. | 428/36.92 |
| 4,874,804 | 10/1989 | Brady et al. | 524/100 |
| 5,310,803 | 5/1994 | Hansen | 525/228 |
| 5,331,033 | 7/1994 | Stauffer et al. | 524/275 |
| 5,373,049 | 12/1994 | Ornstern et al. | 524/487 |

FOREIGN PATENT DOCUMENTS

| | | |
|---|---|---|
| 0078122B1 | 5/1983 | European Pat. Off. |
| 0547797A1 | 6/1993 | European Pat. Off. |
| 0547798A1 | 6/1993 | European Pat. Off. |
| 0547799A1 | 6/1993 | European Pat. Off. |

OTHER PUBLICATIONS

"Ethylene–n–butyl Acrylate Resins for Adhesive Formulating", Preliminary Information Report, U.S.I. Chemicals.
"Hot melts in recycled packaging", E. M. Wise, Editorial, Tappi Journal, Sep. 1990.
"The Role of specific gravity for removal of hot melt adhesives in recyclable grades", E. M. Wise and J. M. Arnold, Tappi Journal, Sep. 1992.
Material Safety data Sheet: ESCORENE® XX–22.AA, Exxon Chemical Company, May 31, 1994.
Technical Bulletin HMA001–REVO, May 31, 1992, Sasolwaks C80, SASOL Chemical.

Primary Examiner—Paul R. Michl
Assistant Examiner—LaVonda R. DeWitt
Attorney, Agent, or Firm—Ellen T. Dec

[57] ABSTRACT

Hot melt adhesive compositions consisting essentially of: a) 15 to 45% by weight of at least one ethylene n-butyl acrylate copolymer containing 15 to 40% by weight n-butyl acrylate and having a melt index of at least 600; b) 25 to 55% of a terpene phenolic tackifying resin or a hydrogenated derivative thereof, the resin having a Ring and Ball softening point less than 125° C.; c) 15 to 40% by weight of a low melting point synthetic Fischer-Tropsch wax; and d) 0 to 1.5% stabilizer. The adhesives are characterized by an excellent balance of high and low temperature performance without sacrifice to machinability or thermal stability.

16 Claims, No Drawings

LOW APPLICATION TEMPERATURE HOT MELT ADHESIVE

BACKGROUND OF THE INVENTION

Hot melt adhesives, 100% solids materials which are applied to a substrate when molten and cool to harden the adhesive layer, are widely used for industrial applications.

U.S. Pat. Nos. 4,816,306 and 4,874,804 to Brady, et al., disclose that hot melt packaging adhesive compositions consisting essentially of 35 to 45% by weight of an ethylene n-butyl acrylate copolymer containing 25 to 45% by weight n-butyl acrylate and having a melt index of at least 50; 35 to 55% of a terpene phenolic tackifier; and 10 to 20% by weight of a high melting point synthetic wax provide adhesives characterized by an excellent balance of high and low temperature performance without sacrifice to its machinability or thermal stability. Further, U.S. Pat. No. 5,331,033 teaches the use of the ethylene n-butyl acrylate copolymers with petroleum hydrocarbon resins and high melting point synthetic waxes to prepare adhesives useful in packages which will be subsequently subjected to repulping operations.

Most commercially available hot melt adhesives, including those discussed above, require temperatures of 350° F. or greater to ensure complete melting of all the components and also to achieve a satisfactory application viscosity. The need for such elevated temperatures is not without problems. Thus, the high temperatures increase the operators risks with respect both to burns and to inhalation of residual volatiles. Finally, the high temperatures require more energy, placing greater demands on the manufacturing facility.

It would be beneficial if hot melt adhesives could be prepared which would melt to application viscosity at lower temperatures and thus could be applied without encountering any of the previously described problems.

SUMMARY OF THE INVENTION

We have now found that hot melt adhesives prepared from ethylene n-butyl acrylate copolymers having a melt index of at least 600, preferably at least about 900, terpene phenolic tackifying resins and a low melting point Fischer-Tropsch wax can be applied at the relatively lower temperatures of 225° to 275° F. yet still provide a good balance of heat and cold resistance as required for most commercial applications.

DETAILED DESCRIPTION OF THE PREFERRED EMBODIMENTS

The ethylene/n-butyl acrylate copolymers (EnBA) useful herein are those containing from about 15 to 40% by weight n-butyl acrylate and having a melt index of at least about at least 600, preferably at least about 900. The preferred copolymers are available from Exxon Chemical under the designation Escorene XW22 and contain approximately 33% n-butyl acrylate by weight and have a melt index of about 900. The amount of the copolymer present in the adhesive varies from 15 to 45% by weight, preferably 25 to 35% by weight.

The tackifying resins useful in the adhesive compositions are the terpene phenolic resins, i.e., phenolic modified terpene resins and hydrogenated derivatives thereof such, for example, as the resin product resulting from the condensation, in an acidic medium, of a bicyclic terpene and a phenol. For use herein, it is also important that the tackifying resin have Ring and Ball softening point less than about 125° C., preferably less than 120° C. The tackifying resins are utilized in amounts of 25 to 55%, preferably 35 to 45%, by weight of the adhesive composition.

Representative commercial resins include Piccofin T 125 from Hercules, Nirez V-2040 from Arizona and Nirez 300 from Arizona, Dertophene T 105 from DRT. Nirez 300, a phenolic modified terpene having a Ring and Ball softening point about 112° C., is the most preferred.

Waxes suitable for use herein are the low melting point synthetic Fischer-Tropsch waxes having a melting point of less than about 100° C. Preferred waxes include Sasolwaks C80, having a melting point of 180° F. and available from Sasol Chem. The wax component is utilized at levels of 15 to 40%, preferably 25 to 35%, by weight of the adhesive.

The adhesives of the invention preferably also contain a stabilizer or antioxidant. Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl)propionate; n-octadecyl-3(3,5-di-tert-butyl-4-hydroxyphenyl)-propionate; 4,4'-methylenebis (2,6-tert-butylphenol); 4,4'-thiobis (6-tert-butyl-o-cresol); 2,6-di-tertbutylphenol; 6-(4-hydroxyphenoxy)-2,4-bis(n-octylthio)-1,3,5 triazine; di-n-octylthio)ehtyl 3,5-di-tert-butyl-4-hydroxy-benzoate; and sorbitol hexa[3-(3,5-di-tert-butyl-4-hydroxyphenyl)-propionate].

The performance of these antioxidants may be further enhanced by utilizing, in conjunction therewith known synergists such, for example, as thiodipropionate esters and phosphites, particularly useful is distearylthiodipropionate. These stabilizers, if used, are generally present in amounts of about 0.1 to 1.5 weight percent, preferably 0.25 to 1.0%. Other additives such as plasticizers, pigments, dyestuffs conventionally added to hot melt adhesives for various end uses contemplated as well as small amounts of additional tackifiers and/or waxes such as paraffin wax may also be incorporated in minor amounts, i.e., up to about 10% by weight, into the formulations of the present invention.

In addition to the components described above, the adhesive compositions may also contain small amounts, i.e., up to about 20% by weight, of polymeric additives such as ethylene vinyl acetate polymers containing 10 to 40% by weight vinyl acetate; ethylene methyl acrylate polymers containing 10 to 28% by weight methyl acrylate; ethylene acrylic acid copolymers having an acid number of about 25 to 150; polyolefins such as polyethylene or polypropylene or poly(butene-1-co-ethylene) polymers as well as other ethylene n-butyl acrylate polymers having lower melt indexes.

The adhesive compositions are prepared by blending the components in the melt at a temperature of about 121° C. until a homogeneous blend is obtained, approximately two hours. Various methods of blending are known to the art and any method that produces a homogeneous blend is satisfactory.

The resulting adhesives are characterized by viscosity less than about 3000 cps at 121° C. They may be applied at temperatures of 107° C. to 135° C. to provide superior adhesive bonds even when exposed to wide variety of temperature conditions. The adhesives possess excellent heat stability as characterized by the 144 hour 121 ° C. thermal stability test, with no signs of char, skinning or gel formation. As such the adhesives find particular use as case, carton and tray forming and as sealing adhesives, for example, in the packaging of cereal, cracker and beer products.

EXAMPLES

In the following examples which are provided for illustrative purposes only, all parts are by weight and all temperatures in degrees Celsius unless otherwise noted.

In the examples, all adhesive formulations were prepared in single blade mixer heated to 121° C. by blending the components until homogeneous.

The adhesives were then subjected to various tests simulating the properties needed for successful commercial applications.

Melt viscosities of the hot melt adhesives were determined on a Brookfield Model RVT Thermosel viscometer using a number 27 spindle.

Test specimens for determining elevated temperature peel and shear strengths were prepared as follows: an adhesive bead ½ inch wide was applied at 121° C. to a strip of 50 pound Kraft paper 1 inch wide by 3 inches long across the width of the paper. A second piece of Kraft paper of the same dimensions was immediately placed over the first piece and 200 gram weight placed on top of the composite construction. The compressed adhesive bead width was 1 inch.

Elevated temperature peel and elevated temperature shear were determined by attaching a 100 gram weight to each specimen and placing the specimens in a forced-draft oven. The temperature was raised in 5.5° C. (10° F.) increments from 38° C. the specimens remained at a given temperature for 15 minutes for conditioning. The heating cycle was run until the final bond failed. Each peel and shear specimen was prepared and tested in duplicate. The elevated peel and shear value shown is the average temperature of failure for the two bonds. In some cases, the sample failed as the temperature was being adjusted within the 10° increments and is noted as such.

Adhesion at various temperatures, as noted, was determined by applying a ½ inch wide bead of adhesive at 121° C. widthwise to a 2 inch by 3 inch piece of substrate (as indicated) and immediately bringing a second piece of board into contact. A 200 gram weight was immediately placed on the construction. The bond specimens were placed in an oven or freezer to obtain the desired test temperature. The bonds were separated by hand and a determination made as to the type of failure and the presence or absence of fiber tear (FT) was noted. The character of the bond failure was also observed and, in the case of bonds which exhibited a brittle crack or shattering of the adhesive, this characteristic was noted as "cold crack" (CC). Cold crack is undesirable since it indicates brittleness, a characteristic that substantially reduces the cohesive strength of the bond.

The tack range (open time) was measured by drawing out a 3 mil thick adhesive film and then qualitatively measuring the range by determining how many finger prints could be made in the film before the film set.

Cloud point is determined by heating the adhesive blends to 121° C. and applying a small bead (approximately 1 gram) of the molten adhesive to the bulb of an ASTM thermometer. The temperature at which the molten adhesive clouds over is then noted. These measures of cloud point provide an indication of a hot melt's overall compatibility, i.e., the compatibility of the individual ingredients with each other. Products that show cloud points near or at the softening point of the wax used in the formulation reflect an overall compatible product. The cloudiness that develops as the material cools is the result of the developing crystallinity of the waxy component (causing refraction of light passing through the sample). Systems which possess cloud points much greater than the softening point of the wax exhibiting a micro separation changing the refraction index of the molten adhesive. The practical significance of products with high cloud points are as follows:

(1) Poor inherent compatibility with a tendency to phase separation upon prolonged heating and heating and cooling cycling such as is experienced in commercial operations.

(2) Poor flow properties resulting in "stringing" from rapid fire, air actuated nozzle equipment.

TABLE I

| ADHESIVE COMPONENTS | 1 | 2 | 3 | 4 |
| --- | --- | --- | --- | --- |
| EnBA (33% nBA, 900 MI) Escorene XW 22 | 33 | 33 | — | — |
| EVA (28% VA, 900 MI) Elvax 205 (Du Pont) | — | — | 33 | 33 |
| Nirez 300 Phenolic Tackifying Resin (Arizona) | 35 | 35 | 35 | 35 |
| C80 Sasolwaks | 32 | — | 32 | — |
| 150° F. Microcrystalline Wax (Bowax 845) | — | 32 | — | 32 |
| Antioxidant Irganox 1010 (Ciba-Geigy) | 0.5 | 0.5 | 0.5 | 0.5 |

TABLE II

| TEST RESULTS | 1 | 2 | 3 | 4 |
| --- | --- | --- | --- | --- |
| Viscosity @ 250° F. | 1580 | 2180 | 2080 | 4780 |
| Peel (°F.) | 120 | 120 | 130 | 130 |
| Shear (°F.) | 170 | 170 | Δ170 | Δ170 |
| Open Time (sec) | 1 | 1 | 1 | 1 |
| Cloud point (°F.) | 200 | 260 | 248 | Incompatible |
| ADHESION TO VIRGIN CORRUGATED BOARD | | | | |
| °F. @ −30 | FT, Sl CC | No FT, No CC | No FT, CC | No FT, CC |
| @ 0 | No FT, No CC | No FT, No CC | No FT, CC | No FT, CC |

TABLE II-continued

| 20  | FT, No CC    | No FT, No CC | No FT, CC    | No FT, CC    |
| --- | ------------ | ------------ | ------------ | ------------ |
| 40  | FT, No CC    | No FT, No CC | No FT, CC    | No FT, No CC |
| RT  | FT, No CC    | FT, No CC    | FT, No CC    | FT, No CC    |
| 130 | FT, No CC    | FT, No CC    | FT, No CC    | FT, No CC    |
| 150 | FT, No CC    | No FT, No CC | FT, No CC    | No FT, No CC |
| 160 | No FT, No CC | No FT, No CC | No FT, No CC | No FT, No CC |

The results presented in these examples illustrate the superior properties obtained by the use of adhesives prepared in accordance with the teachings of the present invention.

Thus, a comparison between adhesives 1 and 2 shows the improved properties obtained by the use of the Sasolwaks in place of microcrystalline wax. A comparison of adhesive 1 with 3 and 4 shows the superior results obtained when the adhesives are formulated with the high melt index EnBA as opposed to similar melt index EVA. In this regard, it should be noted that the cold crack and brittleness of the adhesives prepared with the EVA was far greater than that observed with the EnBA. Moreover, while there was some haze in the EnBA product containing the Sasolwak (Ex. 1), the cloud point was still acceptable. In contrast, the similar EVA formulation (Ex. 3) had a much higher cloud point. Further, the cloud point of Ex. 4 could not even be measured.

TABLE III

This example illustrates the advantages achieved by the use of blends of the high melt index EnBA with lower melt index EnBA polymers.

| ADHESIVE COMPONENTS                      | 4    | 5    | 6    |
| ---------------------------------------- | ---- | ---- | ---- |
| EnBA (33% NBA, 900 MI) Escorene XW 22    | 23   | 23   | —    |
| EnBA (33% VA, 300 MI) Escorene XW 23     | 8    | 8    | —    |
| Vinyl Acetate Modified Wax (AC 540 - Allied) | 7 | 7 | 7    |
| EVA (28% VA, 900 MI) Elvax 205 (Du Pont) | —    | —    | 23   |
| EVA (28% VA, 400 MI) Elvax 210 (Du Pont) | —    | —    | 8    |
| Nirez 300 Phenolic Tackifying Resin      | 35   | 35   | 35   |
| C80 Sasolwaks                            | 27   | —    | 27   |
| 150° F. Microcrystalline Wax (Bowax 845) | —    | 27   | —    |
| Antioxidant Irganox 1010 (Ciba-Geigy)    | 0.5  | 0.5  | 0.5  |

TABLE IV

| TEST RESULTS       | 4                | 5            | 6            |
| ------------------ | ---------------- | ------------ | ------------ |
| Viscosity @250° F. | 2265             | 3000         | 3475         |
| Viscosity @275° F. | 1350             | 1700         | 1790         |
| Peel (°F.)         | Adj 130          | Adj 130      | Adj 130      |
| Shear (°F.)        | Adj 180          | Adj 170      | Adj 170      |
| Open Time (sec)    | 1                | 2            | 1            |
| Cloud point (°F.)  | 205° F.          | Incompatible | Incompatible |
| ADHESION TO VIRGIN CORRUGATED BOARD | | | |
| °F. @−30           | FT, Sl. Cold Crack | FT, CC     | No FT, CC    |
| @0                 | FT, No CC        | FT, No CC    | FT, CC       |
| 20                 | FT, No CC        | FT, No CC    | No FT, CC    |
| 40                 | FT, No CC        | FT, No CC    | No FT, CC    |
| RT                 | FT, No CC        | FT, No CC    | FT, No CC    |
| 130                | FT, No CC        | FT, No CC    | FT, No CC    |
| 165                | FT, No CC        | FT, No CC    | FT, No CC    |

Again, the results (which in some cases were repeated) indicate the overall superior properties obtained by the use of the 900 melt index EnBA with the Sasolwaks (Adhesive 4) over comparable melt index grades of EVA (Adhesive 6), as well as EnBA containing microcrystalline wax (Ex. 5).

EXAMPLE III

For comparison purposes, a sample of hot melt adhesive prepared according to Brady U.S. Pat. No. 4,874,804 was evaluated to determine its viscosity at 121° C. The viscosity was found to be 14,250 cps. rendering that material unsuitable for application at the relatively low temperatures used herein. (In contrast, adhesives prepared above in accordance with the teachings of the present invention exhibited viscosity at 121° C. of less than about 3000 cps.)

We claim:

1. A carton, case or tray formed utilizing a hot melt adhesive composition, said adhesive consisting essentially of:

a) 15 to 45% by weight of at least one ethylene n-butyl acrylate copolymer containing 15 to 40% by weight n-butyl acrylate and having a melt index of at least 600;

b) 25 to 55% of a terpene phenolic tackifying resin or a hydrogenated derivative thereof, the resin having a Ring and Ball softening point less than 125° C.;

c) 15 to 40% by weight of a low melting point synthetic Fischer-Tropsch wax having a melting point less than 100° C,; and d) 0 to 1.5% stabilizer.

2. The carton case or tray of claim 1 wherein the ethylene/n-butyl acrylate copolymer is, present in the adhesive in an amount of 25 to 35% by weight.

3. The carton case or tray of claim 1 wherein the ethylene/n-butyl acrylate copolymer in the adhesive has a melt index of at least 900.

4. The carton case or tray of claim 1 wherein the tackifying resin in the adhesive has a Ring and Ball softening point of less than 120° C.

5. The carton case or tray of claim 1 wherein the tackifying resin in the adhesive is present in an amount of 35 to 45% by weight.

6. The carton, case or tray of claim 1 wherein the wax in the adhesive is present in an amount of 25 to 35% by weight.

7. The carton, case or tray of claim 1 wherein the adhesive contains a blend of an ethylene/n-butyl acrylate copolymer having a melt index of about 900 and an ethylene/n-butyl acrylate copolymer having a melt index of 300.

8. A carton, case or tray formed utilizing a hot melt adhesive composition said adhesive consisting essentially of:

a) 15 to 45% by weight of at least one ethylene n-butyl acrylate copolymer containing 15 to 40% by weight n-butyl acrylate and having a melt index of at least 600;

b) 25 to 55% of a terpene phenolic tackifying resin or a hydrogenated derivative thereof, the resin having a Ring and Ball softening point less than 125° C.;

c) 15 to 40% by weight of a low melting point synthetic Fischer-Tropsch wax having a melting point less than 100° C.;

d) 0 to 20% by weight of a polymeric additive selected from the group consisting of ethylene vinyl acetate containing 10 to 40% by weight vinyl acetate, ethylene methyl acrylate polymers containing 10 to 28% methyl acrylate, ethylene acrylic acid copolymers having an acid number of 25 to 150, polyethylene, polypropylene, poly-(butene-1-co-ethylene), and lower melt index ethylene n-butyl acrylate copolymers; and e) 0 to 1.5% stabilizer.

9. Hot melt adhesive compositions consisting essentially of:

a) 15 to 45% by weight of at least one ethylene n-butyl acrylate copolymer containing 15 to 40% by weight n-butyl acrylate and having a melt index of at least 600;

b) 25 to 55% of a terpene phenolic tackifying resin or a hydrogenated derivative thereof, the resin having a Ring and Ball softening point less than 125° C.;

c) 15 to 40% by weight of a low melting point synthetic Fischer-Tropsch wax having a melting point less than 100° C.; and d) 0 to 1.5% stabilizer, said adhesive characterized by a viscosity of less than 3000 cps at 135° C.

10. The adhesive of claim 9 wherein the ethylene/n-butyl acrylate copolymer is present in the adhesive in an amount of 25 to 35% by weight.

11. The adhesive of claim 9 wherein the ethylene/n-butyl acrylate copolymer in the adhesive has a melt index of at least 900.

12. The adhesive of claim 9 wherein the tackifying resin in the adhesive has a Ring and Ball softening point of less than 120° C.

13. The adhesive of claim 9 wherein the tackifying resin in the adhesive is present in an amount of 35 to 45% by weight.

14. The adhesive of claim 9 wherein the wax in the adhesive is present in an amount of 25 to 35% by weight.

15. The adhesive of claim 9 wherein the adhesive contains a blend of an ethylene/n-butyl acrylate copolymer having a melt index of about 900 and an ethylene/n-butyl acrylate copolymer having a melt index of 300.

16. The adhesive of claim 9 wherein the adhesive formed utilizing a hot melt adhesive composition said adhesive consisting essentially of:

a) 15 to 45% by weight of at least one ethylene n-butyl acrylate copolymer containing 15 to 40% by weight n-butyl acrylate and having a melt index of at least 600;

b) 25 to 55% of a terpene phenolic tackifying resin or a hydrogenated derivative thereof, the resin having a Ring and Ball softening point less than 125° C.;

c) 15 to 40% by weight of a low melting point synthetic Fischer-Tropsch wax having a melting point less than 100° C.;

d) 0 to 20% by weight of a polymeric additive selected from the group consisting of ethylene vinyl acetate containing 10 to 40% by weight vinyl acetate, ethylene methyl acrylate polymers containing 10 to 28% methyl acrylate, ethylene acrylic acid copolymers having an acid number of 25 to 150, polyethylene, polypropylene, poly-(butene-1-co-ethylene), and lower melt index ethylene n-butyl acrylate copolymers; and e) 0 to 1.5% stabilizer.

\* \* \* \* \*